United States Patent
Bannier et al.

(10) Patent No.: US 8,453,778 B2
(45) Date of Patent: Jun. 4, 2013

(54) MOTOR VEHICLE BATTERY SUPPORTING STRUCTURE

(75) Inventors: Nathalie Bannier, Saint Nom la Breteche (FR); David Beddock, Massy (FR)

(73) Assignee: Renault s.a.s., Boulogne-Billancourt (FR)

( * ) Notice: Subject to any disclaimer, the term of this patent is extended or adjusted under 35 U.S.C. 154(b) by 164 days.

(21) Appl. No.: 13/058,014

(22) PCT Filed: Aug. 4, 2009

(86) PCT No.: PCT/FR2009/051549
§ 371 (c)(1),
(2), (4) Date: Feb. 8, 2011

(87) PCT Pub. No.: WO2010/015777
PCT Pub. Date: Feb. 11, 2010

(65) Prior Publication Data
US 2011/0139527 A1 Jun. 16, 2011

(30) Foreign Application Priority Data
Aug. 8, 2008 (FR) ..................................... 08 55490

(51) Int. Cl.
*B60R 16/04* (2006.01)
(52) U.S. Cl.
USPC ...................................................... 180/68.5
(58) Field of Classification Search
USPC ........................ 180/68.5, 65.1, 68.1, 274, 208
See application file for complete search history.

(56) References Cited

U.S. PATENT DOCUMENTS

| | | | | | |
|---|---|---|---|---|---|
| 4,216,839 | A | * | 8/1980 | Gould et al. | 180/65.1 |
| 5,238,082 | A | * | 8/1993 | Stegeman et al. | 180/208 |
| 5,390,754 | A | * | 2/1995 | Masuyama et al. | 180/68.5 |
| 5,501,289 | A | * | 3/1996 | Nishikawa et al. | 180/68.5 |
| 5,585,205 | A | * | 12/1996 | Kohchi | 180/68.5 |
| 5,853,058 | A | | 12/1998 | Endo et al. | |
| 6,040,080 | A | * | 3/2000 | Minami et al. | 429/96 |
| 6,227,322 | B1 | | 5/2001 | Nishikawa | |
| 7,070,015 | B2 | * | 7/2006 | Mathews et al. | 180/68.5 |
| 7,466,102 | B2 | * | 12/2008 | Andersson et al. | 180/68.5 |
| 7,654,351 | B2 | * | 2/2010 | Koike et al. | 180/68.5 |
| 7,905,307 | B2 | * | 3/2011 | Kubota et al. | 180/68.1 |
| 7,926,602 | B2 | * | 4/2011 | Takasaki | 180/68.5 |
| 2003/0047364 | A1 | | 3/2003 | Lipman | |
| 2004/0144580 | A1 | | 7/2004 | Wu | |

FOREIGN PATENT DOCUMENTS

| EP | 1 441 401 | 7/2004 |
|---|---|---|
| JP | 8 67151 | 3/1996 |
| JP | 9 274899 | 10/1997 |

OTHER PUBLICATIONS

International Search Report issued Dec. 1, 2009 in PCT/FR09/51549 file Aug. 4, 2009.

* cited by examiner

*Primary Examiner* — Hau Phan
(74) *Attorney, Agent, or Firm* — Oblon, Spivak, McClelland, Maier & Neustadt, L.L.P.

(57) ABSTRACT

A motor vehicle battery supporting structure configured to be attached and fixed to the body structure of this vehicle, and to carry a battery in a form of a frame to surround the battery, the frame having in its center an opening suitable for insertion of the battery, and a first battery locking mechanism is provided on the frame so as to allow the battery to be locked to and unlocked from the frame.

12 Claims, 4 Drawing Sheets

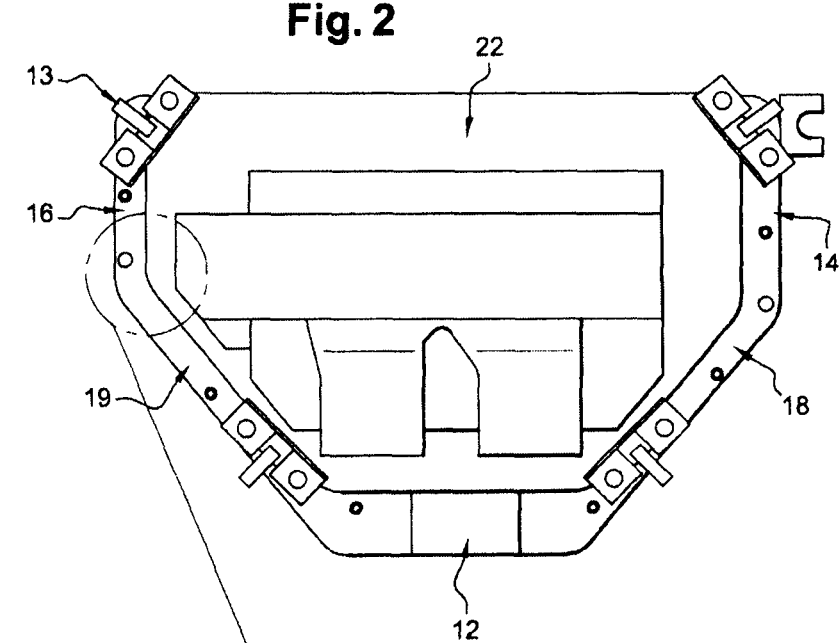
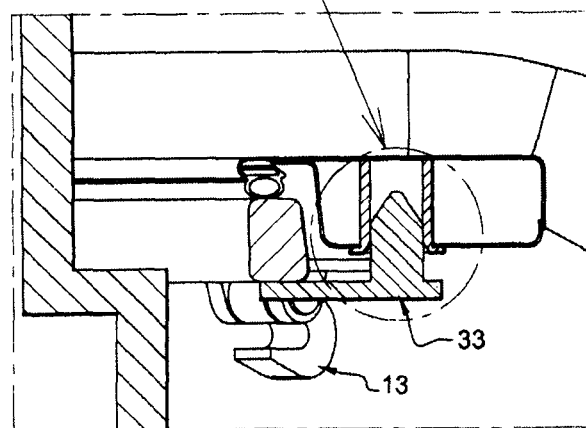

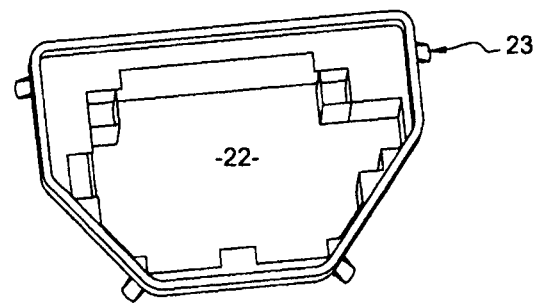
Fig. 6
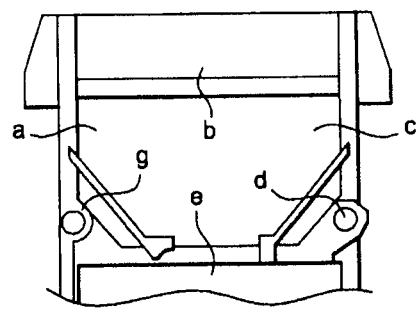
Fig. 7
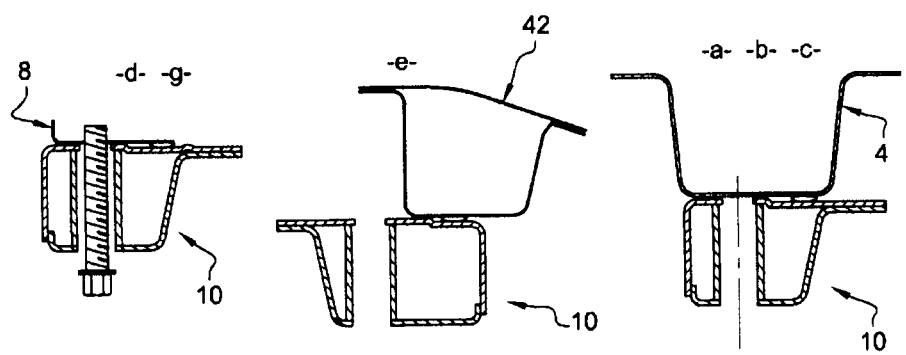

MOTOR VEHICLE BATTERY SUPPORTING STRUCTURE

BACKGROUND

The present invention relates to a motor vehicle battery supporting structure.

Means for fixing batteries in electric vehicles are known, in particular from document WO 2007049127. These batteries, assemblies of "stacks", have the form of a casing secured to side members of the vehicle via intermediate fixing means.

Conventionally, these batteries are located in the front unit of the vehicle, spaced apart from the front end in order to protect the battery from any deformation of the structure during an impact. They can also be located under the vehicle and thus be protected from a frontal or rear impact. In the case of a battery that has to be located close to one longitudinal end of the vehicle, and for example when a battery is located at the rear of the vehicle, it is advisable to take particular account of the supporting environment of this battery in order that an impact against the vehicle cannot damage this battery and consequently represent a danger to the user.

BRIEF SUMMARY

One of the objectives of the invention is thus to provide a motor vehicle battery supporting structure that protects the battery from impacts suffered by the vehicle. A further objective is to present a supporting structure allowing quick and easy handling of the associated battery, in particular with a view to exchanging batteries on a single supporting structure. Thus, the battery supporting structure is designed to have the functions that make this exchangeability possible, such as the locking, connections, and sealing of the battery with respect to the vehicle.

In response to these objectives, which are encountered invariably with the various motor vehicle manufacturers, the present invention is also intended to have a low cost and to take up little space.

In order to meet these objectives, the invention provides a motor vehicle battery supporting structure, able firstly to be attached and secured to the bodyshell structure of this motor vehicle and secondly to carry a battery, characterized in that this supporting structure has the form of a frame able to surround the battery, the frame having in its center an opening suitable for fitting the battery, and characterized in that first battery locking means are carried on the frame such that the battery can be locked and unlocked on this frame.

The invention is defined in a more precise manner by the claims.

BRIEF DESCRIPTION OF THE DRAWINGS

Further features and advantages of the invention will become apparent from reading the following detailed description, in order to understand which reference is made to the appended drawings, in which:

FIG. 2 is a view of the battery supporting structure in FIG. 1 and of the associated battery;

FIG. 2a is an enlargement of FIG. 2, showing specifically an indexing means of the battery in the supporting structure according to the invention;

FIG. 6 is a top view of the fairing secured to the battery according to the invention;

FIG. 7 is a bottom view of the vehicle underframe, indicating the position of section views showing more specifically the butted joints of the supporting structure against the vehicle bodyshell.

DETAILED DESCRIPTION

As shown in the figures, a battery supporting structure is attached and secured to the bodyshell structure 4 of the vehicle and is in the form of a frame 10, the form and dimensions of which are suitable for fixing this frame 10 firstly to side members 44, 46 and secondly to cross members 41, 42 forming structural elements of the vehicle that are approximately perpendicular to the side members. Thus, in a general manner, the frame 10 extends approximately horizontally and transversely between the left-hand side member and the right-hand side member, at the front or the rear depending on the location at which the battery is installed, respectively in the front unit or in the rear unit of the vehicle.

Figure 1:
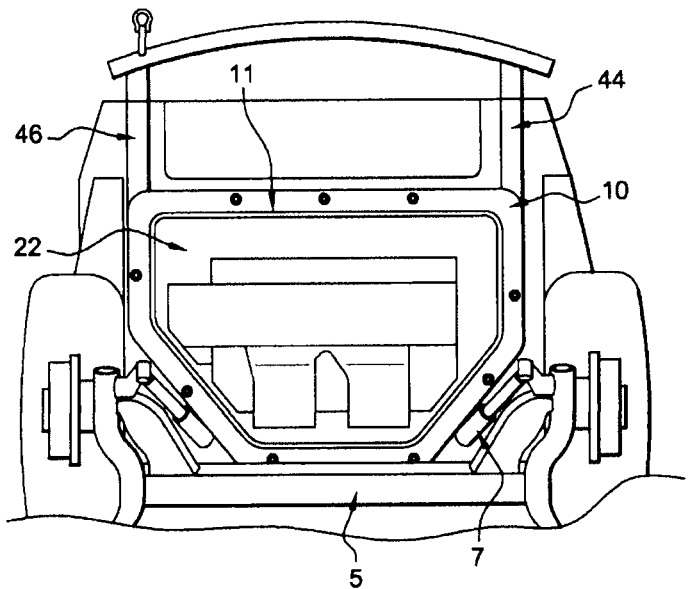
FIG. 1 is a bottom view of a vehicle rear underframe, provided with a battery supporting structure according to the invention.

According to the example shown in FIG. 1 relating to the installation of a battery 2 and a supporting structure according to the invention in a vehicle rear unit, the frame 10 forming this supporting structure is attached and screwed under the left-hand and right-hand rear side members 44, 46, under a specific rear cross member 41, and under a central underframe cross member 42. This installation takes place taking account of the architecture of the rear axle assembly, represented in particular by a rear axle-assembly cross member 5 and shock absorbers 7 located between the bodyshell and the wheel supports.

Figure 3:
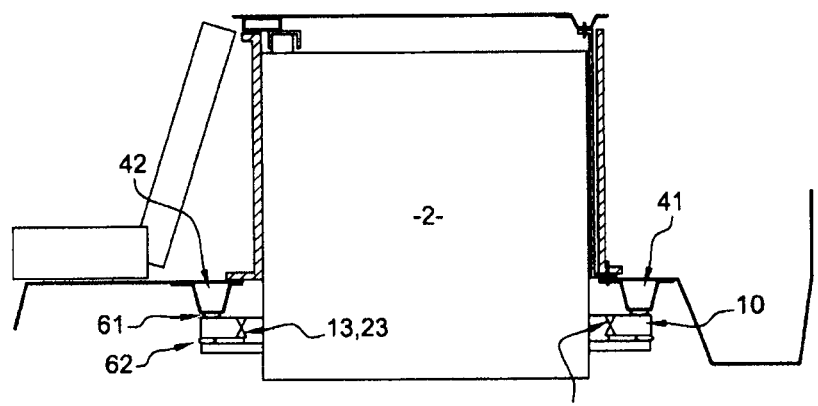
FIG. 3 is a diagram of the assembly formed in the vehicle by a battery and a supporting structure according to the invention, in a view from below the vehicle.

The center of the frame 10 has an opening suitable for fitting a battery 2, this battery being able to engage with the frame 10 in order to lock the battery 2 in position with respect to the frame 10 and thus with respect to the bodyshell structure 4. According to the diagram in FIG. 3, the stack of these components is as follows, namely, from top to bottom, a bodyshell structure 4 of the vehicle, a frame 10 secured to this bodyshell structure 4, having first sealing means 61 located between the bodyshell 4 and the frame 10, and finally a battery 2 locked under the frame 10, second sealing means 62 being located between the battery 2 and the frame 10.

First locking means 13 are carried on the frame 10 and have a form that is complementary with second locking means 23 secured to the battery 2. The engagement of these first and second locking means fixes the battery with respect to the supporting frame 10 when the battery is in the position desired by the operator.

As shown, these first locking means 13 can have the form of hooks or a latch, intended to hook locking or striker lugs distributed around the periphery of the battery and forming the second locking means 23. It will be understood that the battery 2 can be surrounded and carried by a fairing 22, shown by way of example in FIG. 6, and that it is on this fairing 22 that the second, abovementioned locking means 23 can in particular be formed. This fairing 22 can be formed from aluminum and could have particular thermal characteristics on account of carrying the battery 2.

The precision of assembly between the battery 2 and the supporting frame 10 is achieved by positioning the battery by reference to guides and rings integrated into the frame and by indexing means, which are shown in FIG. 2a and are in the form of indexing pins 33 that are integrated into the battery and are guided into holes formed in the lower face of the frame 10. These indexing pins 33 also stop movement in translation longitudinally and transversely during impacts.

The precision of assembly between the supporting frame 10 and the bodyshell structure 4 is achieved by guide pins 35 located on the upper face of the frame 10 and able to engage with arrangements of the bodyshell structure.

These indexing and guide pins also fulfill an anti-burst function by stopping longitudinal and transverse movement in translation during impacts, firstly of the frame 10 with respect to the bodyshell structure 4 and secondly of the battery 2 with respect to the frame 10.

It will be understood that the position of the locking means 13, 23 and of the indexing means 33 on the frame 10 is calculated to hold the battery 2 in an optimized manner with respect to the frame 10. The fact that there are four locking means located around the periphery of the frame 10 means that the battery and the associated fairing 22 are held strongly. However, without departing from the context of the invention, this number of locking means could be different and the position thereof could be modified. In all these cases, the locking means are designed to hold tension during forces produced by movements of the battery 2 relative to the supporting frame 10 under the effect of a sudden deceleration in particular during impacts.

Figure 5:
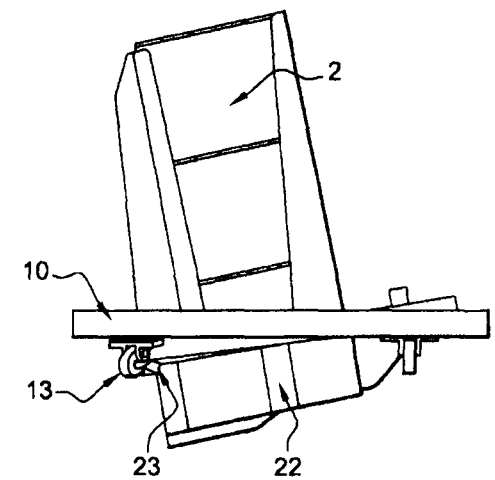
FIG. 5 is a side view of the battery supporting structure in FIG. 1 and of the associated battery.

The battery 2 is positioned with respect to the frame 10 such that this battery is completely surrounded by the frame 10 and extends vertically both above the frame 10 and below it. The architecture of the vehicle dictates in the figures that the battery 2 is located substantially below this frame 10, but this frame 10 is high enough for the rocking of the battery with respect to the frame 10 and to the bodyshell of the associated vehicle during an impact to be controlled, as shown in FIG. 5.

The frame 10 is formed by a hollow body dimensioned with respect to the excitation mode for acoustic performance and for endurance, it being possible for this hollow body to be produced in one piece by casting, or in a plurality of pieces by drawing for example, either from aluminum or from steel.

Figure 4:
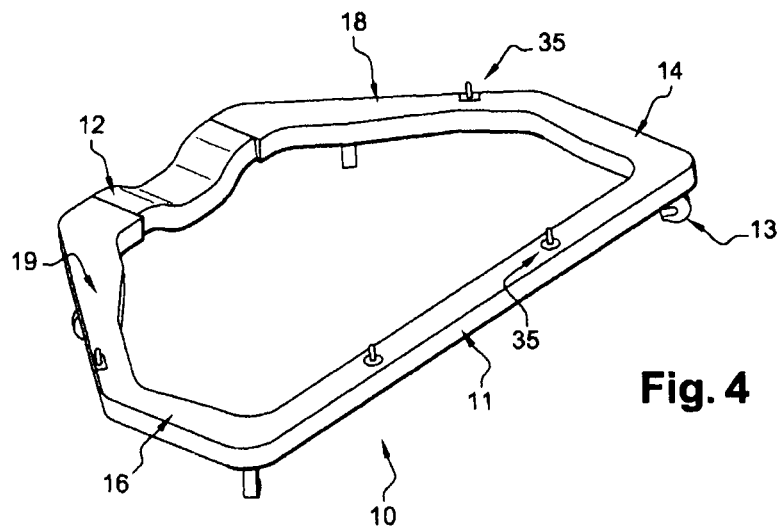
FIG. 4 shows a top view of the frame forming the battery supporting structure according to the invention.

As shown in particular in FIG. 4, the frame 10 has an approximately rectangular rear part that is formed by a first transverse element 11, able to be located under the rear cross member 41 of the vehicle structure, and by two lateral elements 14, 16 that are approximately perpendicular to the first transverse element 11 and are able to be located under the side members 44, 46 of the vehicle. The frame 10 also has a front part, extending the rear part approximately in the same plane, said front part being in the form of a trapezoid with a second transverse element 12 forming the short base approximately parallel to the first transverse element 11, this second transverse element 12 being able to be located under the central cross member 42 of the vehicle structure. This second transverse element 12 attached to the lateral elements 14, 16 of the rear part of the frame 10 by oblique elements 18, 19 that are able to be located under the shock absorber clevises.

The frame 10 has the form of an approximately planar and horizontal hollow body, except for the second transverse element which has a wave form, this arrangement being produced in order to position the sealing ring for high-tension and low-tension cables to pass through from the underframe to a sealed region of the vehicle. However, the frame is approximately planar overall. In addition, it completely surrounds the battery and passes around the entire perimeter thereof at its side walls, in such a way that a part of the battery protrudes above and below the frame or is able to protrude in this way in the event of an impact, as illustrated in FIG. 5. The respective locking means of the battery and of the frame are thus located at an intermediate height of the battery.

The presence of the frame 10 makes it possible to envision attaching ancillary elements of the battery to this frame 10, in particular a protective bell housing attached to the frame 10. This protective bell housing makes it possible to manage the soundproofing and the dirt-proofing and also isolates the magnetic field generated by the battery. The protective bell housing is thus welded to the frame 10 and extends above the frame 10, while still enabling the battery 2 to be mounted through the frame 10, from underneath the latter.

The battery supporting structure according to the invention thus has the combined advantage of automating the replacement of the batteries while providing protection for the battery and also stiffening the general structure of the bodyshell. The automation of replacing the batteries is made possible by the referencing of the vehicle during a change of battery by the indexing of this battery on the frame secured to the bodyshell.

The invention claimed is:

1. A motor vehicle battery supporting structure, configured to be attached and secured to a bodyshell structure of the motor vehicle and to carry a battery, comprising:
   an approximately planar frame configured to completely surround a battery, the frame including in its center an opening configured to fit the battery such that the battery extends vertically above an uppermost portion of the frame and below a lowermost portion of the frame; and
   first battery locking means carried on the frame, the first battery locking means including hooks or a latch to attach to the battery such that the battery can be locked and unlocked on the frame.

2. The battery supporting structure as claimed in claim 1, wherein the frame includes an approximately rectangular rear part formed from a first transverse element and two lateral elements approximately perpendicular to the first transverse element, the frame further includes a front part, extending the rear part approximately in a same plane, and including a second transverse element approximately parallel to the first transverse element, the second transverse element being shorter than the first transverse element, and being connected to the lateral elements of the rear part of the frame by oblique elements.

3. The battery supporting structure as claimed in claim 2, wherein the frame has a form of an approximately horizontal hollow body, the second transverse element having a wave form configured to position a sealing ring for cables to pass through.

4. The battery supporting structure as claimed in claim 1, wherein guide pins are carried on one face of the frame and are configured to engage with formations on the bodyshell structure of the vehicle.

5. The battery supporting structure as claimed in claim 1, wherein indexing holes are formed on one face of the frame and are configured to engage with indexing pins carried on the battery.

6. A battery supporting arrangement for a motor vehicle, comprising:
   a battery supported by a supporting structure as claimed in claim 1,
   wherein second locking means are secured to the battery and are configured to directly engage with the first locking means carried on the frame, such that the battery extends vertically both above and below the frame.

7. The supporting arrangement as claimed in claim 6, wherein the battery is surrounded and carried by a fairing, and the second locking means is formed on the fairing.

8. The supporting arrangement as claimed in claim 6, wherein the fairing has specific thermal characteristics appropriate for carrying the battery.

9. The supporting arrangement as claimed in claim 6, wherein the second locking means include locking or striker lugs directly connected to the hooks or the latch of the first locking means.

10. The supporting arrangement as claimed in claim 6, wherein the second locking means are secured to the battery via a fairing.

11. A motor vehicle comprising:
a battery supported by a supporting structure as claimed in claim 1,
wherein a form and dimensions of the frame of the supporting structure are configured to fix the frame approximately horizontally both under side members of the vehicle and under cross members forming structural elements of the vehicle that are approximately perpendicular to the side members.

12. The motor vehicle as claimed in claim 11, wherein the frame is secured to the bodyshell structure, first sealing means being located between the bodyshell and the frame, and a battery is fixed and locked on the frame, second sealing means being located between the battery and the frame.

* * * * *